(12) United States Patent
Cacciabeve

(10) Patent No.: US 12,292,167 B1
(45) Date of Patent: *May 6, 2025

(54) HANDHELD LIGHT WITH VIEWING SPACE

(71) Applicant: Walter R. Tucker Enterprises, Ltd., Deposit, NY (US)

(72) Inventor: Robert Cacciabeve, Denville, NJ (US)

(73) Assignee: Walter R. Tucker Enterprises, Ltd, Deposit, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,337

(22) Filed: Oct. 17, 2024

Related U.S. Application Data

(63) Continuation-in-part of application No. 18/819,576, filed on Aug. 29, 2024.

(60) Provisional application No. 63/657,368, filed on Jun. 7, 2024.

(51) Int. Cl.
| | | |
|---|---|---|
| *F21L 4/04* | (2006.01) | |
| *F21V 19/02* | (2006.01) | |
| *F21V 21/096* | (2006.01) | |
| *F21V 21/30* | (2006.01) | |
| *F21V 21/40* | (2006.01) | |
| *F21Y 113/00* | (2016.01) | |
| *F21Y 115/10* | (2016.01) | |
| *G02B 25/02* | (2006.01) | |

(52) U.S. Cl.
CPC ............. *F21L 4/04* (2013.01); *F21V 19/02* (2013.01); *F21V 21/096* (2013.01); *F21V 21/0965* (2013.01); *F21V 21/30* (2013.01); *F21V 21/406* (2013.01); *F21Y 2113/00* (2013.01); *F21Y 2115/10* (2016.08); *G02B 25/02* (2013.01)

(58) Field of Classification Search
CPC ........ F21L 4/04; F21V 21/096; F21V 21/406; F21V 21/0965; F21V 21/30; G02B 25/02
USPC ............................ 362/398, 197, 227
See application file for complete search history.

(56) References Cited

U.S. PATENT DOCUMENTS

| | | | | |
|---|---|---|---|---|
| 5,967,643 A * | 10/1999 | Chan | ........................ | G02B 25/02 362/208 |
| 8,303,142 B2 * | 11/2012 | Bryant | ................. | F21V 21/0925 362/184 |
| 8,833,962 B2 * | 9/2014 | Ko | ....................... | F21V 21/0885 362/427 |
| 2006/0082990 A1 * | 4/2006 | Hsu | ......................... | F21L 4/045 362/157 |
| 2013/0176715 A1 * | 7/2013 | Rubino | .................. | F21V 17/105 362/323 |

FOREIGN PATENT DOCUMENTS

| | | | | |
|---|---|---|---|---|
| CA | 2789155 A1 * | 8/2011 | .............. | F21L 4/027 |

OTHER PUBLICATIONS

Machine translate of DE-102005055680-A1 (Apr. 24, 2008) (Year: 2008).*

(Continued)

*Primary Examiner* — Laura K Tso
(74) *Attorney, Agent, or Firm* — Breiner & Breiner, L.L.C.

(57) ABSTRACT

A handheld light having a viewing space comprising a light body and a handle wherein the light body includes a viewing space and wherein the handle may include a rotating base.

11 Claims, 8 Drawing Sheets

(56) References Cited

OTHER PUBLICATIONS

Machine translate of CN-201387512-Y (Jan. 20, 2010) (Year: 2010).*
Feit Electric 500/1000 Lumens LED Rechargeable Handheld Work Light 3004639, https://www.homedepot.com, 6 pages, Nov. 20, 2024.

* cited by examiner

HANDHELD LIGHT WITH VIEWING SPACE

RELATED APPLICATION

This application claims benefit of U.S. Provisional Application Ser. No. 63/657,368, filed Jun. 7, 2024, entitled "Handheld Light With Viewing Space," and is a continuation-in-part of U.S. application Ser. No. 18/819,576, filed Aug. 29, 2024, entitled "Portable Light," which applications are incorporated herein by reference in their entirety.

FIELD OF THE INVENTION

The present invention relates to a handheld light. More particularly, the invention relates to a handheld light with a viewing space.

BACKGROUND OF THE INVENTION

Handheld work lights are known in the art, including E-Z Red Company's U.S. Pat. No. 10,962,180.

A problem with the known handheld lights is that when working in a tight work area, the user will focus the light on the work area and the lighting device will block the worker's view of the object being worked on.

The known handheld work lights, while useful, are open to improvement. The present invention is directed to an improved handheld light.

SUMMARY OF THE INVENTION

A primary object of the invention is to provide a handheld light with a viewing space.

Another primary object of the invention is to provide a handheld light with a viewing space allowing the user to focus the light on the work area and to be able to see the work area through the viewing space.

Another primary object of the invention is to provide a handheld light with a viewing space having a light body and a handle.

Another primary object of the invention is to provide a handheld light with a viewing space having a light body, a handle, and a rotating base.

Another primary object of the invention is to provide a handheld light with a viewing space wherein the light body may rotate to multiple positions.

Another primary object of the invention is to provide a handheld light with a viewing space having a light to focus on the work area and a spotlight to provide additional light to a specific work area.

Another primary object of the invention is to provide a handheld light with a viewing space having a light body, a handle and a rotating base, wherein the rotating base includes one or more magnets to attach the light to a metal surface.

Another primary object of the invention is to provide a handheld light with a viewing space which is rechargeable.

The invention is directed to a handheld light having a viewing space comprising a light body and a handle wherein the light body includes the viewing space.

The invention is further directed to a handheld light having a viewing space comprising a light body having the viewing space and a handle, wherein the handle includes a rotating base.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

Figure 2:
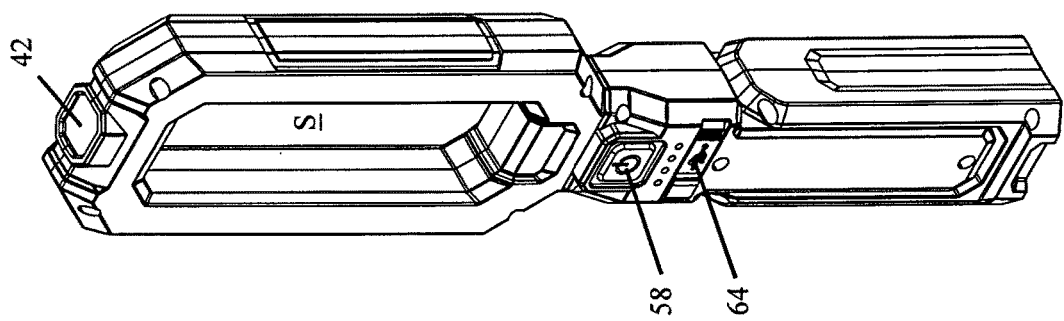
FIG. 2 is a rear and side perspective view of the light of FIG. 1.
Figure 10:
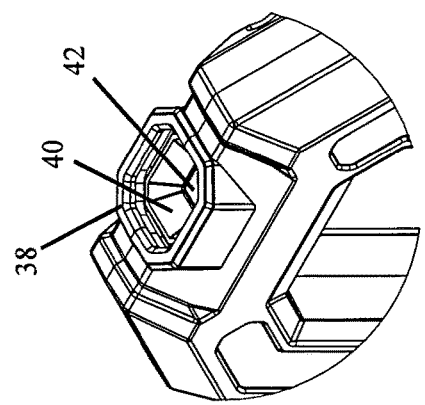
FIG. 10 is an enlarged view of section 10 of FIG. 1.
Figure 1:
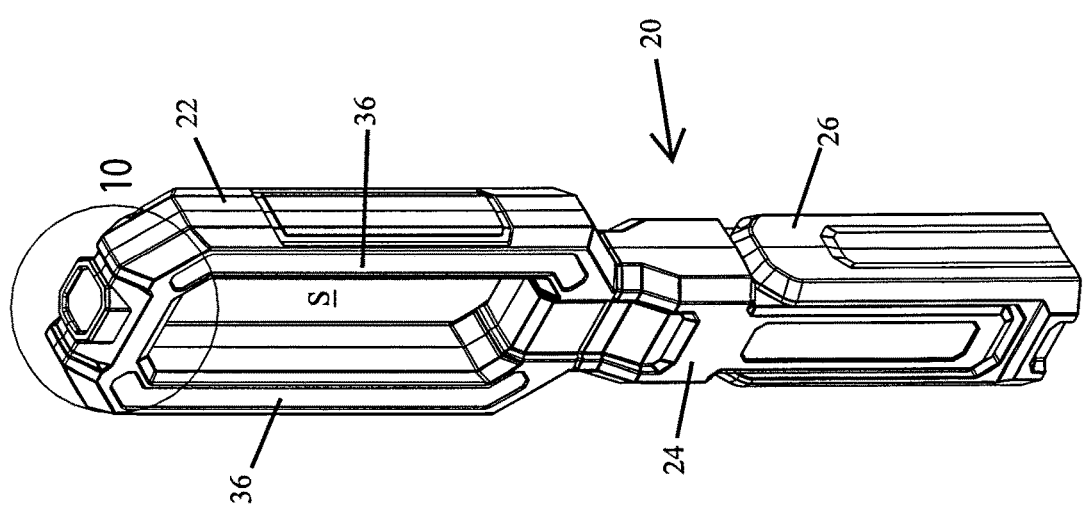
FIG. 1 is a front and side perspective view of the handheld light of the invention.

The present invention is directed to a handheld light having a viewing space. The viewing space allows the worker to focus the light on the work area and prevents the light from blocking the view of the work area due to an open space in the light body.

Referring to the drawings, there is disclosed a preferred embodiment of the handheld light with the viewing space. However, it is understood that modifications to this preferred embodiment may be made without departing from the scope of the invention.

Referring to the drawings, there is disclosed a handheld light with a viewing space 20. The light 20 includes a light body 22, a handle 24 and a rotating base 26. The light body 22 includes a viewing space S for the worker to view the work area when using the light.

Figure 11:
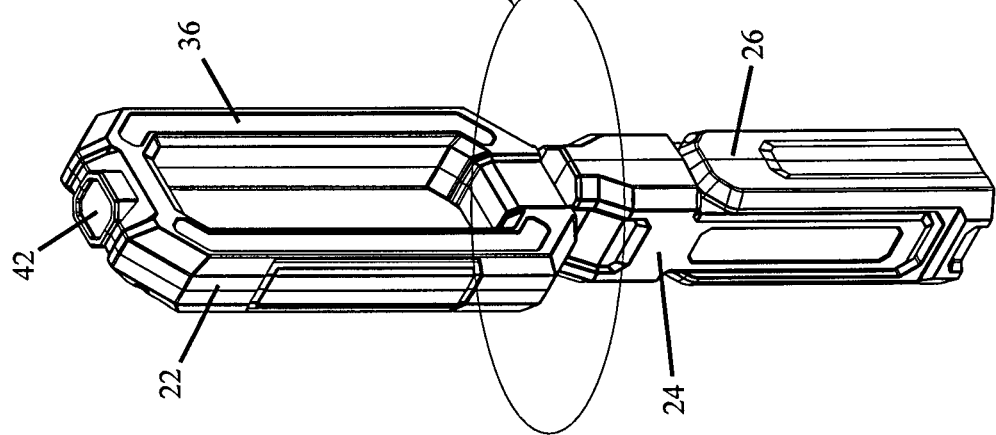
FIG. 11 is a perspective view of the light of FIG. 1 showing the rotation of the light body on the handle.
Figure 13:
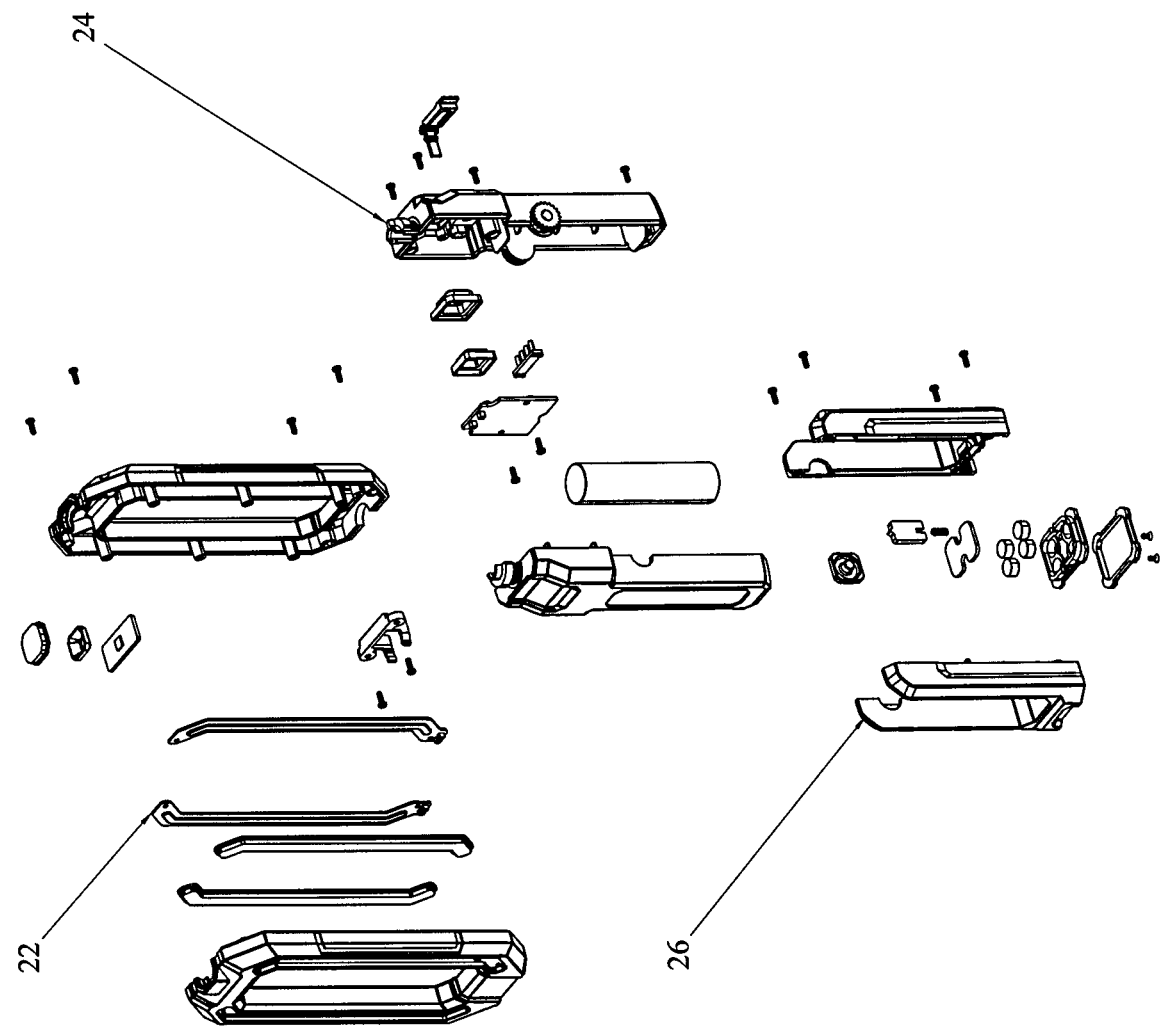
FIG. 13 is an exploded view of the light of FIG. 1.
Figure 14:
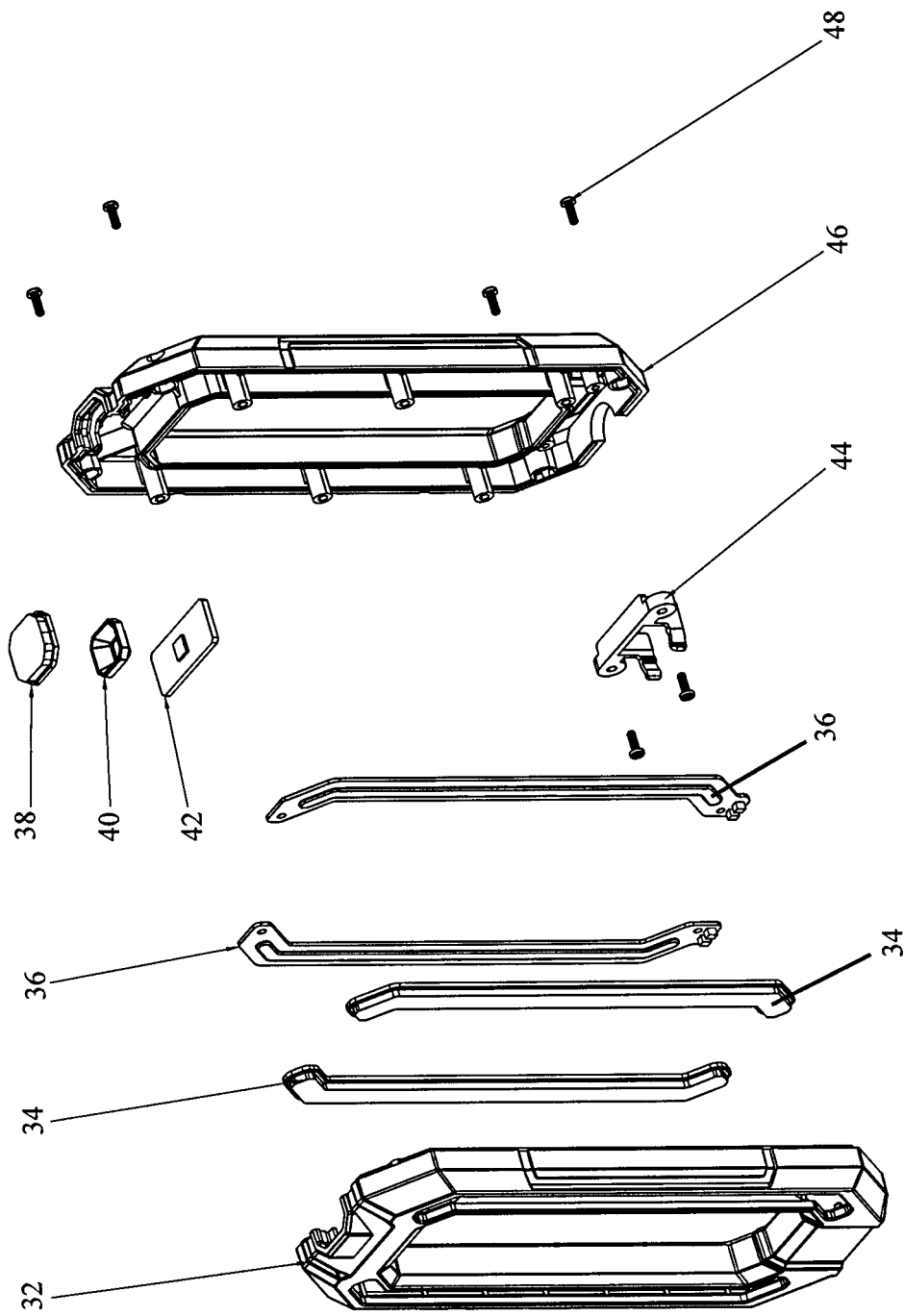
FIG. 14 is an exploded view of the light body of the light of FIG. 1.

Referring to FIG. 14, there is shown an exploded view of the light body 22 including a front body cover 32, an area light lens 34, an area light LED 36, a spotlight lens 38, a spotlight reflector 40, a spotlight LED 42, a pivot center lock 44, a rear light body cover 46 and fasteners 48 for connecting the front light body cover 32 to the rear light body cover 46. As shown in FIG. 11, the light body 22 may rotate on handle 24 with 330 degrees of rotation. Rotation is provided by pivot center lock 44 and the structure of collar 61 of handle 24.

Figure 15:
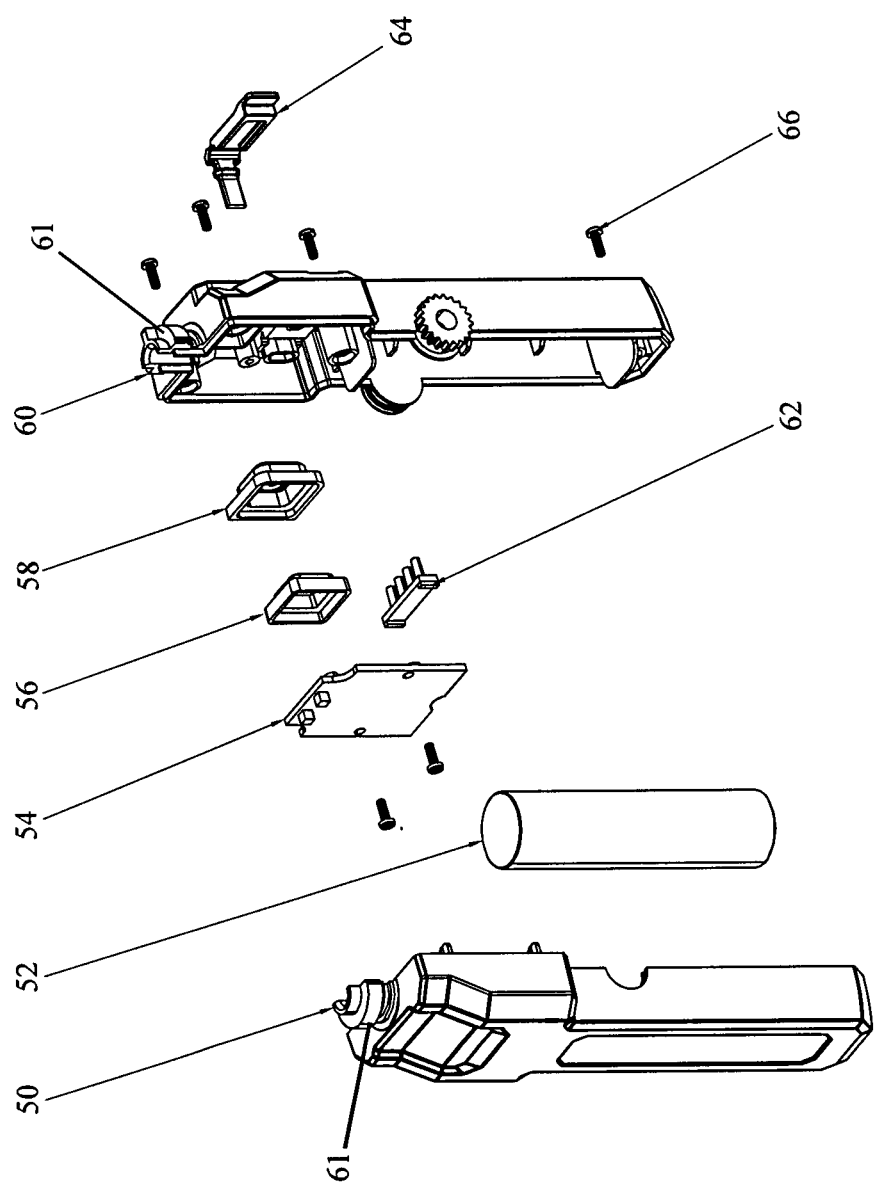
FIG. 15 is an exploded view of the handle of the light of FIG. 1.

Referring to FIG. 15, there is shown an exploded view of the handle 24. The handle 24 comprises a front handle 50, a rechargeable battery 52, a PCB 54, a button retainer 56, a button 58, a rear handle 60, a collar 61, a charge indicator cover 62, a charge port cover 64 and fasteners 66 for connecting front handle 50 to rear handle 60.

Figure 9:
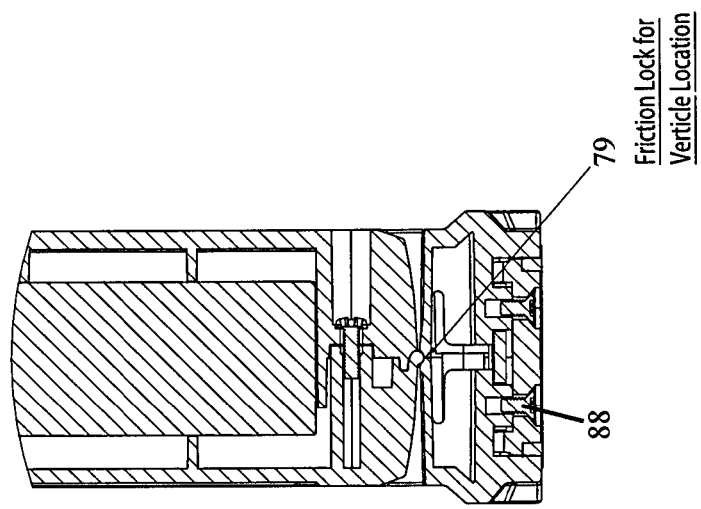
FIG. 9 is an enlarged view of section 9 of FIG. 8.
Figure 12:
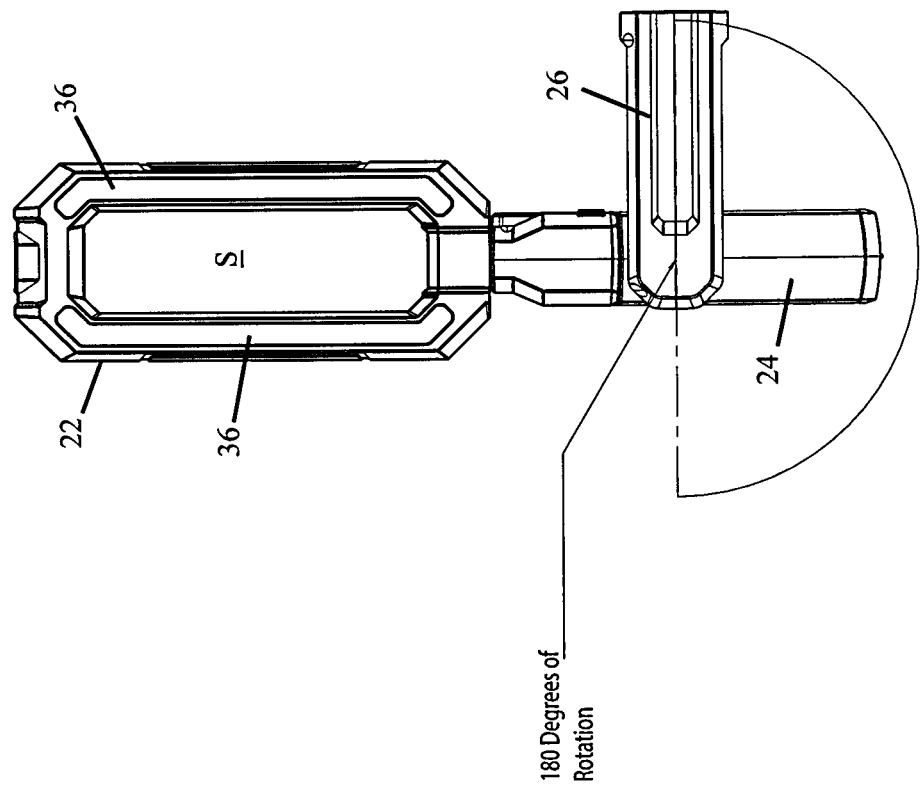
FIG. 12 is a side view of the light of FIG. 1 with the light body rotated and the base rotated.
Figure 16:
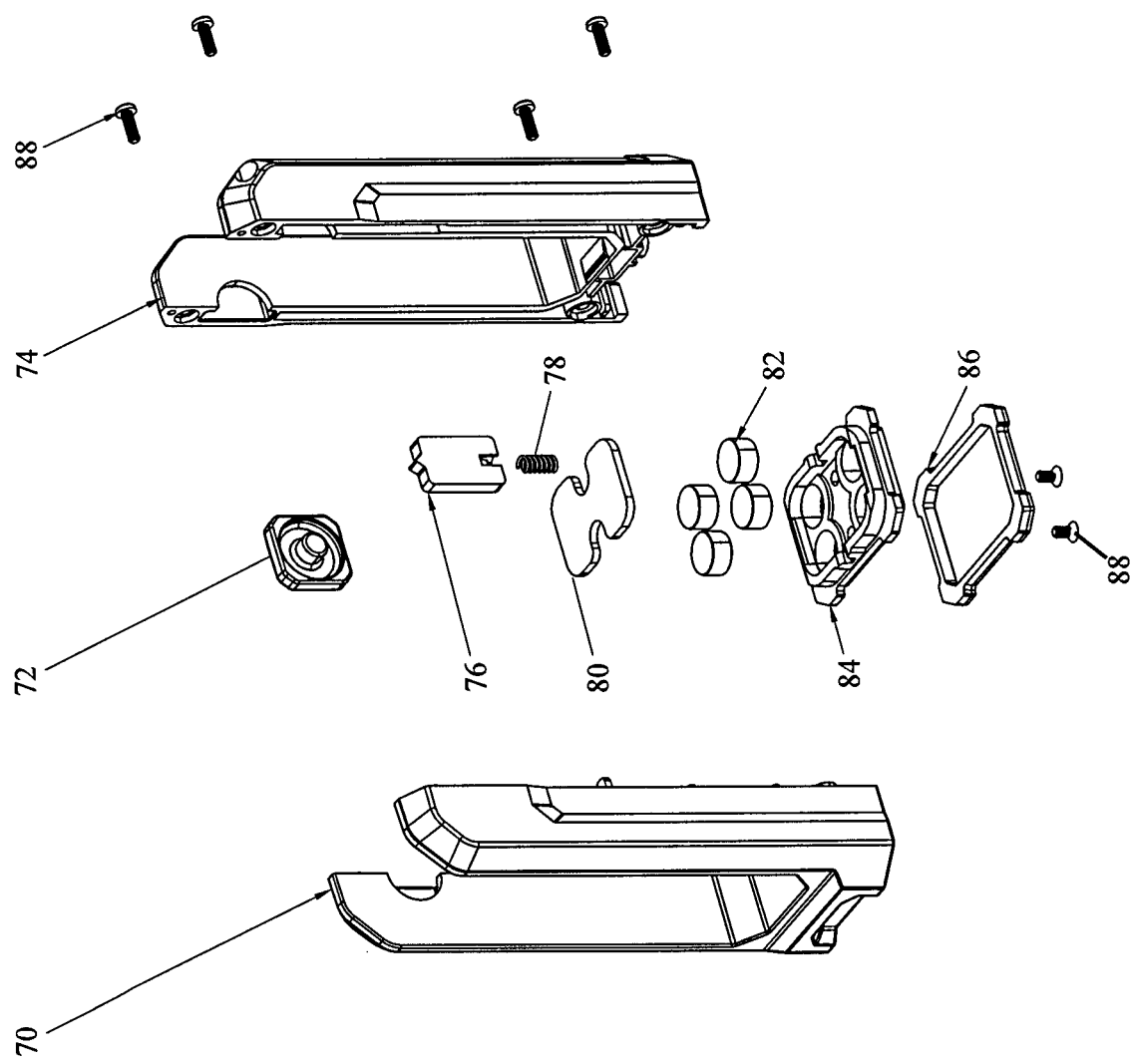
FIG. 16 is an exploded view of the base of the light of FIG. 1.

Referring to FIG. 16, there is shown an exploded view of base 26. Base 26 comprises a front base cover 70, a friction insert 72, a rear base cover 74, a ratcheting insert 76, a ratcheting spring 78, a steel plate 80, magnets 82, a base plate 84, a base plate over mold 86, and fasteners 88 for connecting the components. Base 26 may rotate 180 degrees as shown in FIG. 12. The rotation is provided by friction insert 72, ratcheting insert 76 and ratcheting spring 78. Friction lock 79 locks base 26 in a vertical position as shown in FIG. 9. The magnets 82 may attach light 20 to a metal surface, preferably when the base 26 is in a rotated position.

Figure 8:
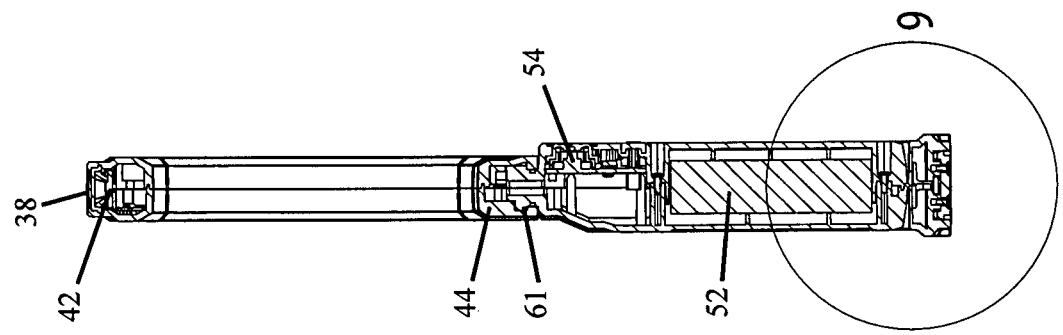
FIG. 8 is a cross-section of the light of FIG. 3 taken along lines 8-8.
Figure 3:
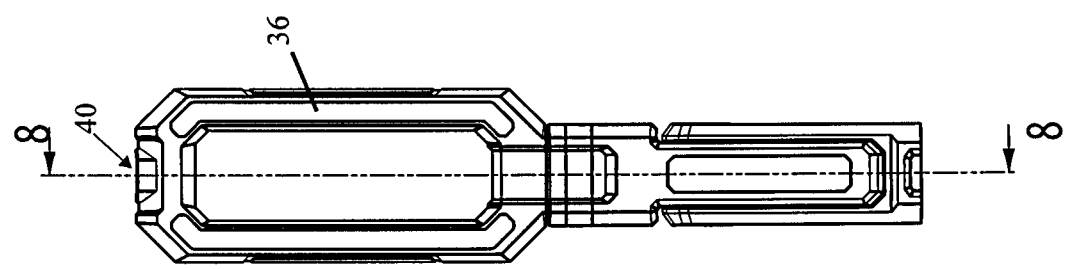
FIG. 3 is a front view of the light of FIG. 1.
Figure 6:
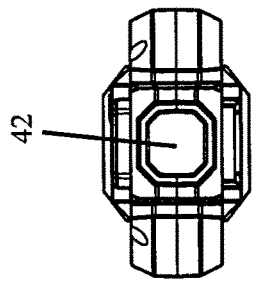
FIG. 6 is a top view of the light of FIG. 1.
Figure 7:
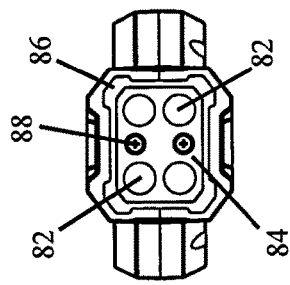
FIG. 7 is a bottom view of the light on FIG. 1.
Figure 5:
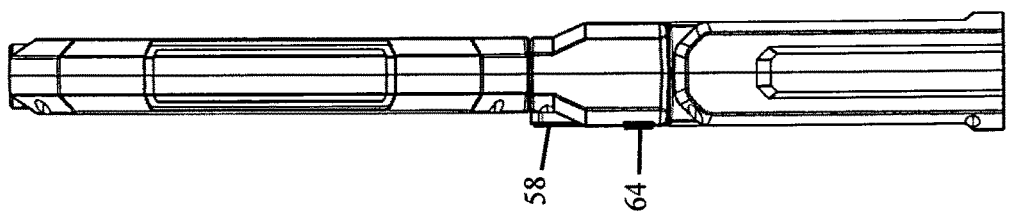
FIG. 5 is a side view of the light of FIG. 1.
Figure 4:
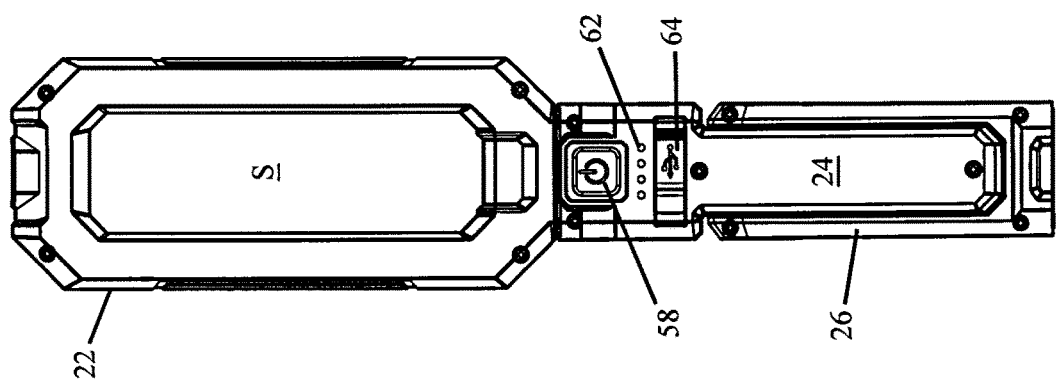
FIG. 4 is a rear view of the light of FIG. 1.

Referring to FIG. 8, there is shown a cross-sectional view of light 20 taken along lines 8-8 of FIG. 3. This view shows components of the light member, including spotlight lens 38, spotlight LED 42, rechargeable battery 52, PCB 54, pivot center lock 44 and collar 61.

Referring to FIG. 9, there is shown an enlarged view of section 9 of FIG. 8 providing additional detail to the structure of the light 20, including the friction lock 79 at the bottom of handle 24 for mating with a corresponding detent in base 26 to provide for vertical location of base 26 or handle 24.

In use, the light is turned on by push button 58 and focused on a work area. The LED area lights 36 focus light on the work area. The worker may see through space S of light body 22 to the work area and the light body 22 will not block the view of the worker. The light body 22 may be rotated to better focus the light 20 depending on the work area. Additionally, base 26 may be rotated and the light attached to a metal surface depending on the work area. Additionally, by pushing button 58 a second time, lights 36 turn off and spotlight 42 turns on and the spot light may be focused on a specific work area.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A handheld light with a viewing space comprising a light body with the viewing space wherein the viewing space comprises an opening in the center of the light body adapted to allow a user to view an environment of use through the opening; and a handle attached to the light body wherein the light body rotates on the handle.

2. The handheld light of claim 1 wherein the handle includes a rotating base.

3. The handheld light of claim 2 wherein the rotating base includes one or more magnets adapted to attach the light to a metal surface.

4. The handheld light of claim 1 wherein the light body includes a first light member and a second light member.

5. A handheld light with a viewing space comprising
a light body with a viewing space,
a handle, and
a rotating base
wherein the light body is adapted to be attached to the top of the handle and the light body is adapted to rotate on the handle,
wherein the rotating base is adapted to be attached to side walls of the handle and is adapted to rotate up and down on the handle, and
wherein the rotating base includes one or more magnets at a bottom surface of the rotating base and the light is adapted to be hand held and attached magnetically to a metal surface.

6. The handheld light of claim 5 wherein the light body includes a first LED light and a second LED light.

7. The handheld portable light of claim 6 wherein the handle includes a rechargeable battery, a PCB, a charge port, a charge indicator and an on/off button.

8. The handheld portable light of claim 7 wherein the rotating base includes a housing wherein the housing includes a base plate of four magnets.

9. The handheld light of claim 5 wherein the light body is adapted to rotate 330 degrees.

10. The handheld light of claim 5 wherein the rotating base is adapted to rotate 180 degrees.

11. The handheld light of claim 10 wherein the rotating base is adapted to rotate by ratcheting movement.

\* \* \* \* \*